(12) United States Patent
Mikhail et al.

(10) Patent No.: US 7,069,802 B2
(45) Date of Patent: Jul. 4, 2006

(54) DISTRIBUTED POWER TRAIN (DGD) WITH MULTIPLE POWER PATHS

(75) Inventors: Amir S. Mikhail, Santa Barbara, CA (US); Edwin C. Hahlbeck, Pewaukee, WI (US)

(73) Assignee: Clipper Windpower Technology, Inc., Carpenteria, CA (US)

( * ) Notice: Subject to any disclaimer, the term of this patent is extended or adjusted under 35 U.S.C. 154(b) by 464 days.

(21) Appl. No.: 10/449,342

(22) Filed: May 31, 2003

(65) Prior Publication Data

US 2004/0237683 A1    Dec. 2, 2004

(51) Int. Cl.
*F16H 57/00* (2006.01)

(52) U.S. Cl. .................... 74/410; 74/665 GD
(58) Field of Classification Search ............ 74/410, 74/458, 665 G, 665 GA, 665 GD
See application file for complete search history.

(56) References Cited

U.S. PATENT DOCUMENTS

| | | | | |
|---|---|---|---|---|
| 2,823,558 A | * | 2/1958 | Semar et al. ............. | 74/665 B |
| 3,545,296 A | * | 12/1970 | Eggins ....................... | 74/410 |
| 5,113,713 A | * | 5/1992 | Isabelle et al. ............. | 74/410 |
| 6,304,002 B1 | * | 10/2001 | Dehlsen et al. ............. | 290/1 C |
| 6,364,611 B1 | * | 4/2002 | Matsuda et al. .......... | 416/170 R |

\* cited by examiner

*Primary Examiner*—William C. Joyce
(74) *Attorney, Agent, or Firm*—Owen L. Lamb

(57) ABSTRACT

An electric power-generating device with a rotor turned by an external source of energy, such as wind or water currents. The rotor is coupled to a main shaft. A pair of bull gears is located on the main shaft. A number of intermediate gears are located around a perimeter of the bull gears. An intermediate gear is connected to an input shaft having a double helix pinion that engages the pair of bull gears. The other intermediate gears are similarly connected to respective input shafts having double helix pimons that engage the pair of bull gears. A plurality of output shafts is provided. An output shaft has a single-helix output pinion that engages two adjacent intermediate gears. The other output shafts are similarly connected to respective adjacent intermediate gears. A number of rotational devices are connected to the output shafts.

21 Claims, 4 Drawing Sheets

DISTRIBUTED POWER TRAIN (DGD) WITH MULTIPLE POWER PATHS

BACKGROUND OF THE INVENTION

1. Field of the Invention

This invention relates to multi-stage gearing apparatus and more particularly to an apparatus for distributing a source of energy to multiple rotational devices.

2. Description of the Prior Art

U.S. Pat. No. 6,304,002, granted on Oct. 16, 2001, describes a power train for an electric power-generating device in which wind or water currents turn a rotor. A torque-dividing gearbox is coupled to an input shaft driven by the rotor. The torque-dividing gearbox has a plurality of output shafts located around a perimeter of the input shaft. A number of torque-reducing gearboxes are each coupled to a respective one of the output shafts, each one of the torque-reducing gearboxes driving a generator. In one design the torque-reducing gearboxes and generators are held stationary and the torque-dividing gearbox includes a bull gear turned by the input shaft. Each one of the output shafts is connected to a gear that engages the bull gear teeth. Alternatively, the torque-reducing gearboxes and generators rotate with the input shaft. The torque-dividing gearbox includes a stationary ring gear having ring gear teeth around an inner circumference. Each of the output shafts is connected to a gear that engages the ring gear teeth.

U.S. Pat. No. 6,731,017 entitled "Improved Distributed power train That Increases Electric Power Generator Density" granted May 4, 2004 discloses an improvement of U.S. Pat. No. 6,304,002 in which a plurality of output shafts are located around a bull gear which is coupled to a main shaft. A number of generators are each coupled to a respective one of the output shafts, such that each one of the output shafts drives a generator. A number of intermediate gears are located around a perimeter of the bull gear, alternating half of the intermediate gears on one side of the bull gear and half on an opposite side of the bull gear. Each one of the intermediate gears is pressure fitted to an intermediate pinion with teeth that engage the bull gear teeth. Each one of the output shafts has two output pinions that engage adjacent intermediate gears, one intermediate gear on one side of the bull gear and one on an opposite side of the bull gear.

The tooth loads on the bull gear are divided n times, where n equals the number of generators, and tooth loads on the intermediate gears and high speed pinions are divided by n×2. This has the advantage that the lessened tooth loads allow for smaller gears and bearings, increasing power density and reducing mass and cost.

As turbines grow in size, the size and weight of individual components grow as well. Wind turbines place these components on top of a tower, presently stretching to over 100 meters above the ground, while ocean current turbines are located at sea, where they can only be accessed by boat. The size of the components necessitates very large lifting equipment, making both the land-based cranes and ocean lifting equipment extremely costly.

By dividing the power train into smaller components, generating systems receive an element of redundancy. For example, when ten small gearboxes and generators split the system's load, if one gearbox or generator experiences a fault, the system's capacity may only be reduced by 10%, allowing the system to remain active. A single generator system loses all of its capacity when the generator experiences a fault.

In wind and water turbine speed increasing systems and other power generation and motoring systems, a high gear ratio is needed, particularly as the size of rotor blades grows and their speed declines. A high gear ratio causes a generator to run at higher speed, lowering its size and cost. A typical prior wind or water turbine power train has three or four step-up stages to achieve the desired gear ratio.

It is therefore desirable to provide a gear configuration that provides large step-up gear ratios in just two steps.

In the prior art, generator rotors are usually supported on a bearing system that is contained within the outside casing of the generator. Bearings are usually lubricated with grease to avoid the expense of a circulating oil system. For very extended life, oil needs to be filtered to remove contamination introduced by wear particles and by environmental intrusion. Grease must be replenished. This results in undesirable maintenance and disposal of hazardous materials.

It is desirable to provide a gearbox-generator combination in which the generator bearings are eliminated.

Gear noise is very objectionable in wind turbines, leading to use of isolators to mount transmissions to wind turbine frames. These isolators contain rubber elements and have a finite fatigue life. They are in the load path of a highly loaded system and are therefore difficult to replace.

It is desirable to provide a gearbox-generator combination in which the generator noise is optimized and isolator gearbox mounts and their attendant cost and maintenance are eliminated.

SUMMARY OF THE INVENTION

Briefly, in accordance with the invention, an apparatus comprises a rotor which revolves in response to an external source of energy to which is coupled a main shaft. A pair of bull gears is located on the main shaft. A number of intermediate gears are located around a perimeter of the bull gears. An intermediate gear is connected to an input shaft having a double helix pinion that engages the pair of bull gears. The other intermediate gears are similarly connected to respective input shafts having double helix pinions that engage the pair of bull gears. A plurality of output shafts is provided. An output shaft has a single-helix output pinion that engages two adjacent intermediate gears. The other single-helix output pinions engage respective adjacent intermediate gears. A number of rotational devices are connected to a respective one of the output shafts.

The pair of bull gears and double helix pinions that engage with it comprise a first stage of a power train and the intermediate gears that engage output pinions on the output shafts comprise a second stage of the power train.

Hereafter the assembly of the input shaft, double helix first stage pinions and the intermediate second stage gear is called the "intermediate assembly", the pinions in the intermediate assembly are called the "intermediate pinions", and the gear in the intermediate assembly is called the "intermediate gear".

The same arrangement can have the input and output reversed, that is, the "input" becomes the output, the "output" becomes the input, and intermediate remains the same. In this configuration, the rotational devices are prime movers, and the bull gear is connected to a driven machine.

In accordance with an aspect of the present invention, the first stage double helix pinions and second stage helical gears (intermediate assembly) have a net thrust reaction of zero, and are mounted on axially non-locating bearings. In the second stage, single helix output pinions engage adjacent second stage helical gears and are not constrained by bearings but are free to move radially. This results in a floating system without using a coupling to equalize thrust loads.

The invention has the advantage that the novel arrangement of the gears, creating multiple power paths, lowers manufacturing cost. This is because the invention uses only external gears, resulting in a cost savings, since external gears are more easily produced and more readily obtained, particularly when the quality desired demands ground teeth.

The invention has the further advantage that by using a double helical input pinion gear, the economy of wide-face gears with smaller diameters is achieved. Double-helical teeth allow wide faces while reducing manufacturing tolerance requirements and have less deflection sensitivity by a factor of 2. This improvement results because each face of the double helical system acts independently for load distribution.

The invention has the further advantage that because the gearing configuration provides large step-up gear ratios in just two steps a rotational device runs at higher speed, lowering its size and cost.

BRIEF DESCRIPTION OF THE DRAWINGS

The invention will be described in detail with reference to the drawings in which.

DESCRIPTION OF THE PREFERRED EMBODIMENTS

In this specification the terms "gear" and "pinion" refer to machine components consisting of a wheel attached to a rotating shaft that operate in pairs to transmit and modify rotary motion and torque (turning force) without slip. A gear may or may not have gear teeth.

Figure 1:
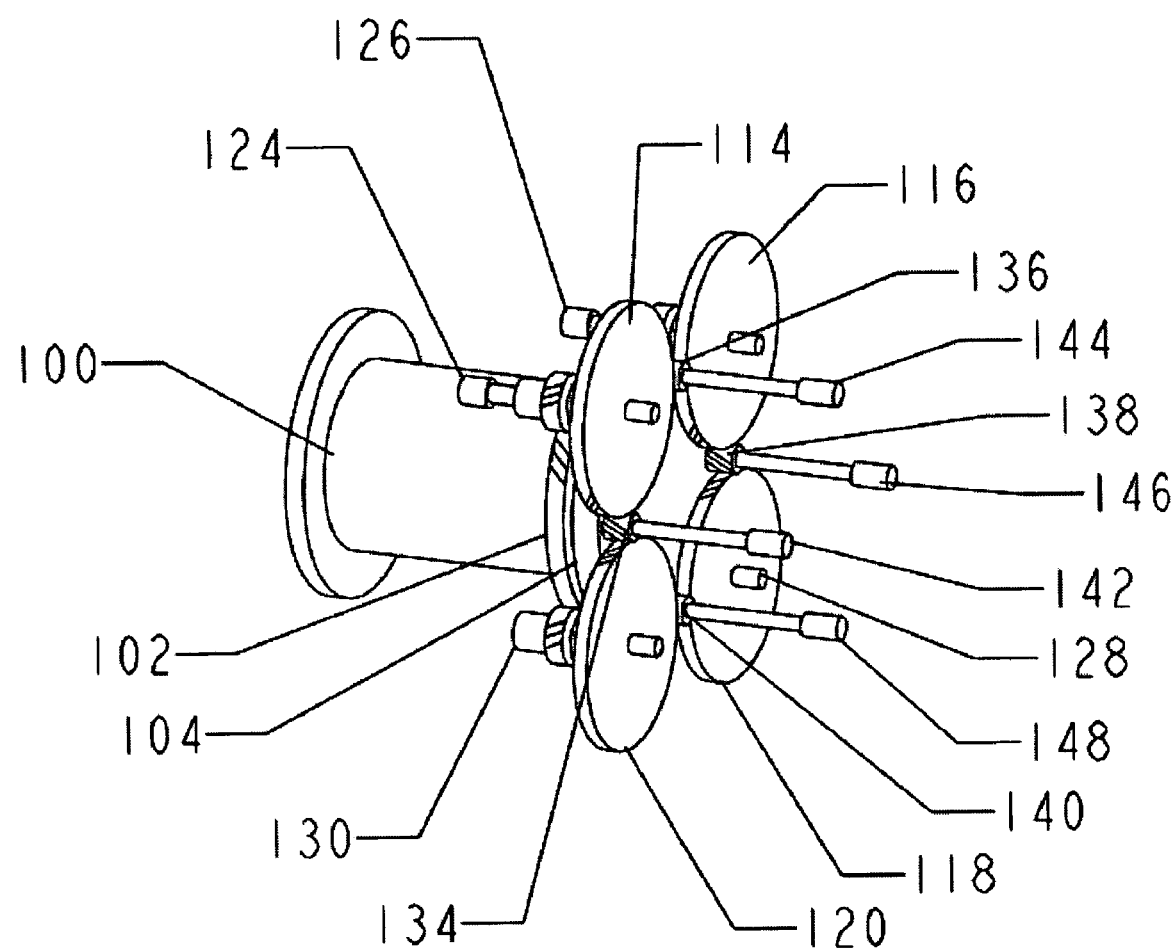
FIG. 1 is a perspective view of the invention showing a distributed power train having four units.
Figure 2:
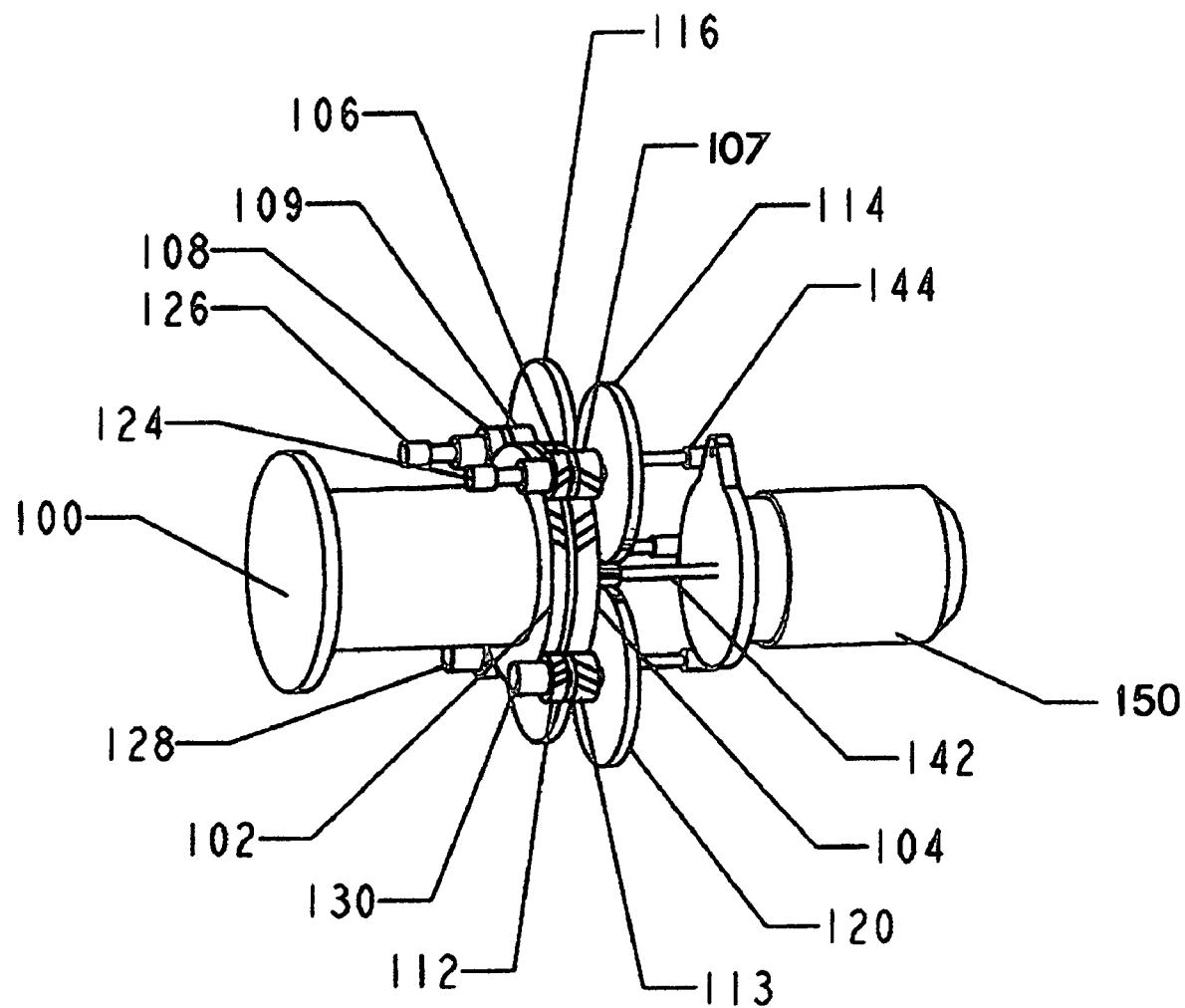
FIG. 2 is a detailed perspective view of the invention shown in FIG. 1.

The invention shown in FIGS. 1–3 is an electric power-generating device that converts a source of energy to electricity. A main shaft 100 is capable of being turned by the source of energy. A pair of bull gears, 102, 104 is located on the main shaft. A number of intermediate gears 114, 116, 118, 120 are located around a perimeter of the bull gears. Intermediate gear 114 is connected to an input shaft 124 having a double helix pinion 106, 107, that engages the pair of bull gears 102, 104. The other intermediate gears 116, 118, 120, are similarly connected to respective input shafts having double helix pinions that engage the pair of bull gears. A plurality of output shafts 142, 144, 146, 148 are provided. Output shaft 144 has an output pinion 136 that engages adjacent intermediate gears 114, 116. The other output shafts 144, 146, 148, are similarly connected to respective adjacent intermediate gears. A number of generators 150, 152, 154, 156, are connected to a respective one of the output shafts. In the illustration of FIG. 2, four output shafts are shown, which will accommodate four generators. However, for clarity only one generator 156 is shown.

Main shaft torque is divided through a plurality of pairs of first-stage intermediate double-helix pinions, 106–107; 108–109; 110–111; 112–113 and intermediate gears, 114, 116, 118, 120. The intermediate gears and pinions are fitted onto input shafts 124,126,128,130. One pair of first-stage pinions is located on the same input shaft as a corresponding intermediate gear. Input shafts 124,126, are extended in length to accommodate braking mechanisms if desired.

High-speed output pinions 134, 136, 138, 140 with helical teeth are fitted onto corresponding output shafts 142, 144, 146, 148. Adjacent pairs of intermediate gears drive output pinions, resulting in torque sharing of a high-speed stage comprised of two intermediate gears and one output shaft. Since each intermediate gear (e.g. 114) engages with pinions (134, 136) on two output shafts 142, 144, significant size reduction of the intermediate gears and the output shafts results. Each output shaft (e.g. 142) is connected to an electric generator 156 (See FIG. 2).

In operation, power supplied by the flow-driven rotation of a rotor is transmitted by rotating main shaft 100 to bull gears 102, 104. Intermediate pinion gears mounted around the perimeter of the bull gears, cause four intermediate shafts 124, 126, 128, 130 to turn at a rotational rate greater than that of the bull-gears. Each intermediate gear 114, 166, 118, 120 mounted on each respective one of four intermediate shafts therefore turn. Each intermediate gear engages two output pinions on output shafts connected to generators. The two-tooth engagement with an output pinion allows the intermediate gear to transmit two times the torque of single tooth engagements. The tooth pressure is unidirectional, that is, not reversing, allowing higher loads than other systems such as planetary systems.

The intermediate gear increases the rotational speed of the output shaft relative to the intermediate gear. The output shaft is directly connected to an electric generator.

Figure 3A:
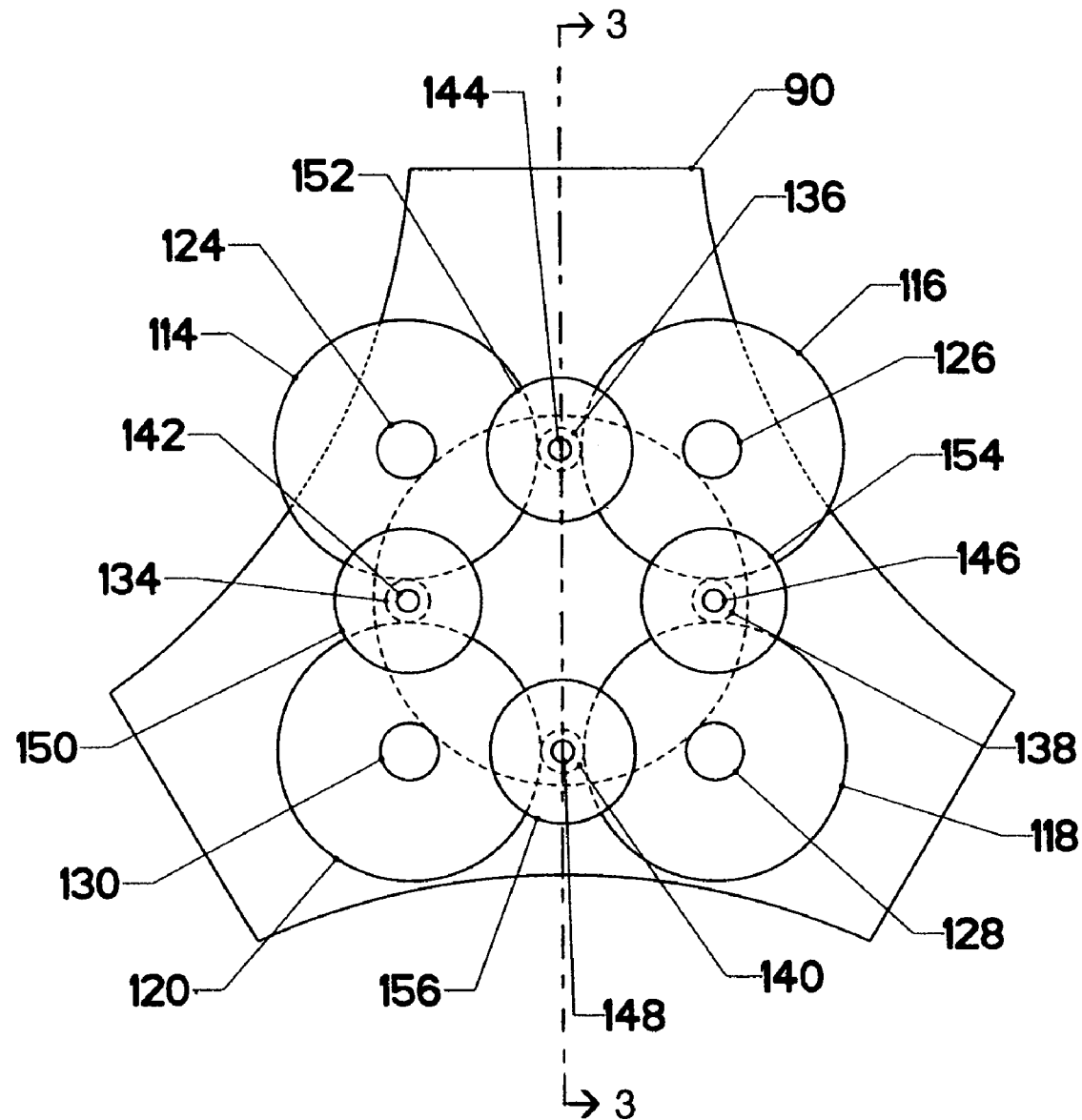
FIG. 3A is an end view of the invention.

FIG. 3A is an end view of the invention shown in FIG. 1 and

FIG. 2. The generators 150, 152, 154, 156 are closest with the rotors 90 behind the gearbox. Reference numerals in FIG. 3A correspond to components with the same reference numerals in FIG. 1.

Figure 3B:
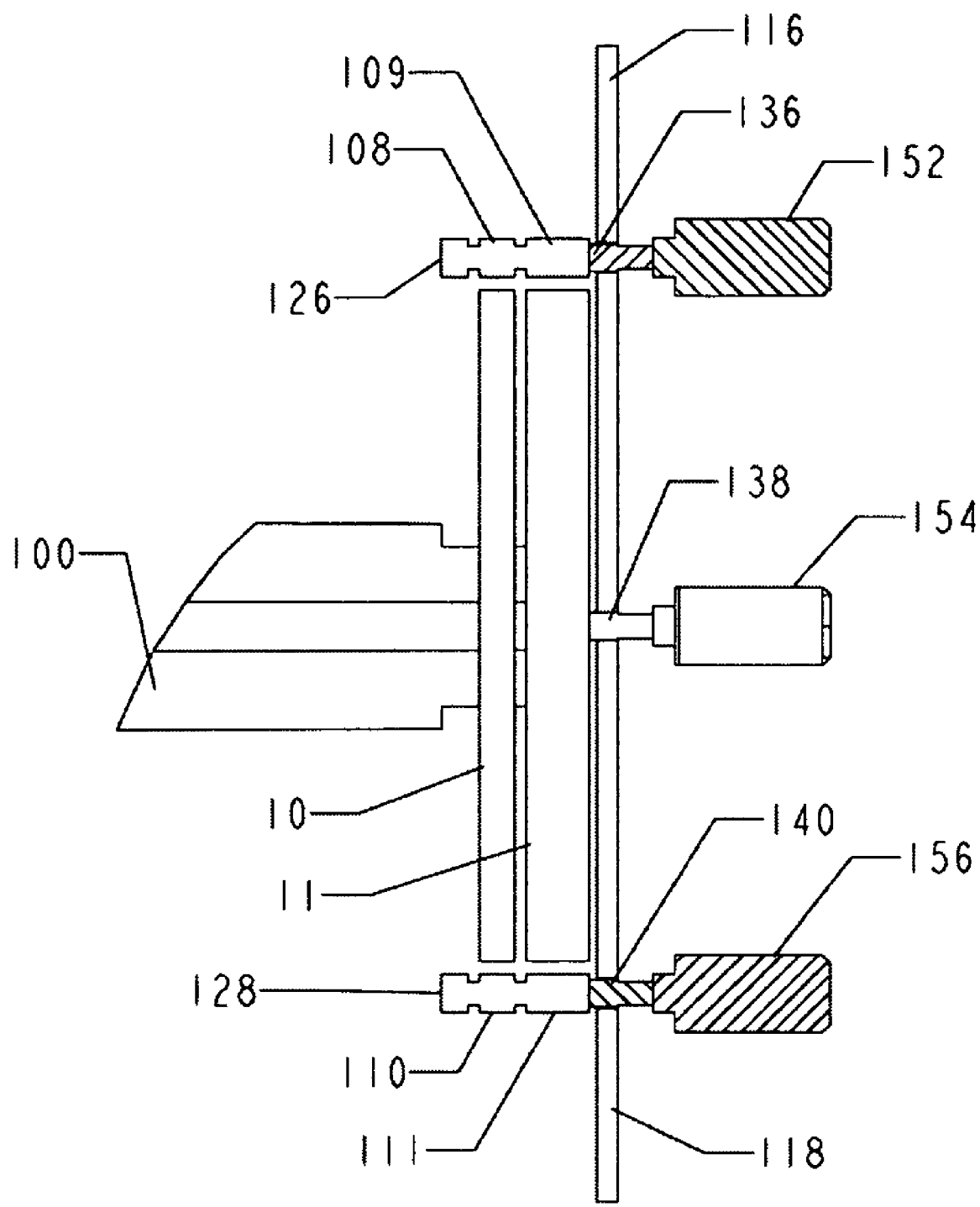
FIG. 3B is a cross-sectional view of the invention shown along view lines 3—3 of FIG. 3A.

FIG. 3B is a cross-sectional view of the invention shown in FIG. 3A. Reference numerals in FIG. 3B correspond to components with the same reference numerals in FIGS. 1, 2, and 3A.

The present invention via a torque-dividing gearbox distributes a high input torque of the rotor 90 between multiple generators 142, 144, 146, 148. The sum of the power producing capacities of the generators is equal to the maximum power delivered by the main shaft 100. This is equivalent to the power produced by a single generator in a conventional system.

This invention lowers manufacturing cost due to a novel arrangement of the gears, creating multiple power paths. In a planetary system, torque is typically introduced to three planets, each of which has two teeth simultaneously engaged, one with the sun, and another with the annulus (ring) gear. Thus, the load is divided 3×2 or 6×total. In planetary systems, however, loads alternate on opposite sides of the teeth (reverse bending), requiring a 30% load reduction to meet life targets. This reduces the effective load division to 4.2 times.

In the present invention, there are eight load paths, so incoming torque is divided eight times. Thus, the difference in the effective load division, between the present invention and planetary systems, is approximately 100%. The present invention uses only external gears, resulting in a cost savings, since external gears are more easily produced and more readily obtained, particularly when the quality demands ground teeth.

The present invention uses double-helical input pinion gears, achieving the economy of wide-face gears with smaller diameters. Since volume, thus weight, increases by the diameter $^2$, and capacity increases linearly with pitch radius, the advantage lies with increasing face width, not diameter. This trend, however, increases the difficulty of attaining a uniform load distribution across the face, an important life factor. This is because capacity and life is based on the highest local stresses, not the average stress. It is well known that double-helical teeth allow wide faces while reducing manufacturing tolerance requirements and have less deflection sensitivity by a factor of 2. This improvement results because each face of the double helical system acts independently for load distribution.

In wind and water turbine and other speed changing systems including motoring or generation, a high gear ratio is needed, particularly as the size of propellers grows and their speed declines. A high gear ratio causes a generator to run at higher speed, lowering its size and cost. The typical wind or water turbine power train has 3 or 4 step-up stages to achieve the desired ratio. The configuration of the present invention provides large step-up gear ratios in just 2 steps.

The use of double-helical gearing on the input pinion gears requires one member to float axially in order to assume equal load division between right and left helices. In multiple power path configurations, the gear elements in multiplicity must be floating members since the singular element cannot satisfy more than one mesh requirement at a time. This required axial freedom of multiple elements, in this case the pinions, presents a dilemma for connecting to subsequent stages. If subsequent stages are also double helical, then the multiplicity element will influence other multiple elements which cannot be inter connected since they couldn't simultaneously satisfy load division for two different stages.

If instead a single helical system is used for the second stage, it will generate a thrust into the first stage system unless it is coupled with a sliding translational device such as a gear type coupling. This is a common solution, but more expensive and complex than if the second stage gear is connected directly on the first stage input shaft.

The novel solution of this invention is to adjust the double helical first stage helices on the pinion gear to unbalance axial forces. The use of two different helix angles accomplishes this, where the net axial thrust force is determined: (Note sign, based on vector direction, where right hand helices are positive values, and left hand helices are negative values.)

$$F_{a1}=F_1+F_2$$

Where:
$F_{a1}$=resultant axial force
$F_1$=axial force, hand 1,=Wt·tan (helix 1)
$F_2$=axial force, hand 2,=Wt·tan (helix 2)
And Wt is the tangential tooth load for each helix In the second stage, the helical output pinion gear helix is selected to produce a resulting force equal to $F_{net}$, and its sign opposite to the difference of $F_1+F_2$.

$$F_{net}=F_{a1}+F_{a2}$$

Where:
$+F_{a2}$=axial force$_{stage\ 2}$,=Wt$_{stage2}$·tan (helix$_{stage2}$)

Thus the first stage pinion and second stage gear (the intermediate assembly) have a net thrust reaction of zero, and can be mounted on non-locating bearings. This results in a floating system without using a coupling to equalize thrust loads.

As the intermediate assembly moves axially in response to manufacturing tolerances to equalize loads, the intermediate gear moves with it. This shift causes a radial change in the tooth locations of the intermediate gear. In this embodiment of the invention, the driven second stage single helix output pinion is not constrained by bearings but is free to move radially. A split path with tooth loads diametrically opposite is employed to react to tooth forces, and convert the forces to torque. Thus, as illustrated in FIG. 1. the axis of each single helix output pinion and the axes of each adjacent intermediate gear are in the same horizontal plane.

The axis of a driven output pinion on an output shaft is unconstrained, allowing radial movement until the tooth forces from the two adjacent intermediate gears that drive the output pinion are balanced. The balanced position is established when $V_1=V_2$ and $V_3=V_4$. Neglecting the mass of the pinion, the result is a self-adjusting system with perfect load division.

In this locked and timed gear system all the tooth loads equalize so long as the output pinion (second stage pinion) is radially unconstrained. This is similar to the sun pinion in planetary systems. With the power evenly split, a low weight, very cost efficient system results.

The above-described gearing is replicated several times around the stage 1 bull gears. The otherwise unused bull gear teeth are available to provide additional output torque paths without adding more cost to the bull gears.

Considering the double-helical gearing on the first stage pinions, there are two pinions per first stage shaft and four first stage shafts (124,126,128,130). The result is 2×4 or 8× total power paths.

In addition to the creation of the split power path in the first stage, the replication of gearing around the bull gears is such that each second stage gear engages two output pinions on the output shafts (142, 144, 146, 148). In this arrangement, the second stage gears have ½ the normal tooth load needed to provide the desired power. With each second stage gear having two simultaneous contacts, the material is more efficiently utilized and the system retains equal power dividing at all the gear meshes.

The output shafts (142, 144, 146, 148) are coupled to generators, resulting in a four-output configuration of extreme compactness.

Permanent Magnet (PM) Generators

The use of permanent magnet (PM) generators is possible due to the technology of increased magnet power, reduced magnet cost, increased efficiency, and simple construction. In this invention, all the advantages of the permanent magnet technology are combined with further simplification of the generator system for wind turbines.

Normally, generator rotors are supported on a bearing system that is contained within the outside casing of the generator. Bearings are usually lubricated with grease to avoid the expense of a circulating oil system. For very extended life, the oil in a circulating oil system needs to be filtered to remove contamination introduced by wear particles and by environmental intrusion. In a system in which bearings are lubricated with grease, the grease must be replenished periodically. This results in undesirable maintenance and disposal of hazardous materials.

In a conventional design, the gearbox output shaft has a bearing system to counteract gear tooth loads, and a coupling to connect this shaft to a generator. Additional structure provides a landing for the generator feet. In the present invention, the output shaft bearings react only to the pinion thrust forces, and thus have unused radial capacity. In the present invention the generator bearings are eliminated, by using the output shaft bearings contained within the gearbox interior. The output shaft bearings are required anyway, and have residual radial capacity. Since the generator rotor support bearings are contained within the gearbox interior, they are lubricated with oil from a common gearbox system. This system already includes cooling and filtration, adding to the lifetime of the generator bearings without additional cost.

When generators have permanent magnets, there is a very strong attraction to close the gap between the magnets and adjacent iron parts. Normally the bearings within the generator control these forces. But, as described above, these bearings are absent.

It is desirable to eliminate generator bearings and also allow removal of the generator for service, but without having the magnets close the air gap and attach themselves to the adjacent iron. Separation of magnets in intimate contact with adjacent iron is difficult and requires special tools and fixtures.

In the present invention, close running labyrinth seals seal the interior generator housing and rotor from the environment. The rotor magnet gap, the housing to rotor clearances, and attachment methods, are designed to allow assembly and disassembly, of the generator from the gearbox, without permitting intimate contact of magnet to iron. The design allows installation and removal without special tools and fixtures.

The generator, in its unmounted condition, has engineered clearances that restrict rotor eccentricity to less than is required for the magnets to get in intimate contact with adjacent iron parts. During assembly to the gearbox, conical pins are used to locate the generator casing to its correct theoretical position while simultaneously conical surfaces on the rotor to gear shaft accomplish the same task. Due to the high centering force of these connections, the magnetic force acting between the partially eccentric rotor magnets and adjacent iron is overcome. As the rotor and generator casing connections are completed, a concentric location is achieved and the generator is prepared to operate. The centering is automatic, requiring the mechanic only to tighten bolts, thereby eliminating normally complex alignment procedures.

In this method, the male and female conical locators are of simple geometry and are easily produced. Common threaded fasteners provide final retention. The system is simple, cheap and effective.

Dismounting the generator is the reverse of the above, requiring removal of a minimal number of fasteners. The conical surfaces are made with sufficient angle to be self-releasing. While cylindrical surfaces are also feasible, they must have significant clearance to permit easy attachment and easy removal. The clearances reduce the contact area against which torque reacts. This will lead to fretting, unless more and larger fasteners are used. Thus, the conical features provide clearance-free contact, while much easier for the installer to mate-up and are self-aligning and self-releasing.

Low Gear Noise Design

Gear noise is very objectionable in wind turbines, leading to use of isolators to mount transmissions to wind turbine frames. These isolators contain rubber elements and have a finite fatigue life. They are in the load path of a highly loaded system and are therefore difficult to replace. In the present invention, such devices are eliminated.

The source of gearbox noise is the vibration energy created by transmission error in the gear meshes. The potential energy level of these vibrations is related to the power at each mesh, particularly those meshes with highest velocity. In the present invention, there are eight meshes with the bull gears that simultaneously transmit the rated power. Thus, the energy per mesh is $\frac{1}{8}^{th}$ as great as in conventional systems. Furthermore, the balanced force on the radially unconstrained output pinions eliminates bending deflection, a major source of transmission error.

In the split torque path apparatus of the present invention the tooth combinations and shaft locations may be phased out of step with each other to avoid the reinforcement of transmission errors that produce vibration and noise. By careful selection of the tooth numbers, the meshing of teeth on different power paths occur out of phase. This means that teeth are entering and leaving the mesh all at different timing, eliminating the summing of vibration energy. This effect is impossible for conventional transmissions that transmit all the rated power through a single mesh.

With the reduced mesh loads, it becomes economical to use gear teeth optimized for noise and not cost. This optimization, along with the reduced vibration forcing function, makes possible the elimination of isolator gearbox mounts and their attendant cost and maintenance.

Those skilled in the art will understand that the gears and pinions shown in the drawings may be replaced by any machine component consisting of a wheel attached to a rotating shaft that operate in pairs to transmit and modify rotary motion and torque (turning force) without slip.

Those skilled in the art will understand that the term "bull gear" as used in the prior art refers to a gear that is much larger than the other gears in the same power train. The gears 102, 104, shown as bull gears with external teeth in the drawings, could be replaced with a gear or gears with gear teeth on an inside internal perimeter of the gear (called a ring gear in the prior art) that engage pinions on the input shaft of an intermediate gear. The term "bull gear" as used in the specification and claims refers to a gear with gear teeth on an external perimeter of the gear or to a gear with gear teeth on an internal perimeter of the gear.

The invention has been described with reference to a bull gear having external or internal gear teeth around a perimeter of the bull gear. The bull gear is coupled to a main shaft that is driven by a source of energy. Those skilled in the art will understand that the main shaft may be fitted directly onto the bull gear, or the main shaft may be indirectly linked to the bull gear. For example, a reciprocating main shaft may impart rotational motion to the bull gear or the main shaft may be combined with other gears or linkages to impart rotational motion to the bull gear.

The invention has been described with reference to a gearing apparatus in which a main shaft is connected to a prime mover input (a source of energy) through intermediate gears to multiple output shafts connected to rotational devices. Those skilled in the art will understand that the same gearing arrangement can have the input and output reversed. That is, the "input" becomes the output, the "output" becomes the input, and intermediate remains the same. In this reversed configuration, the rotational devices become prime movers, and the main shaft is connected to a driven machine.

Those skilled in the art will understand that whereas the invention is described with reference to wind or water current sources of power driving to generators to generate electricity, other sources of power may be utilized to impart torque to the main shaft. Also the invention has been described with reference to electric generations being driven by the multi-stage gearing disclosed. Those skilled in the art will understand that any rotational device or devices may be driven by the gearing. The sources of power and respective appropriate rotational devices driven by the gearing include, but are not limited to (1) fossil fuels, such as diesel motor-generator sets and gas turbines; (2) nuclear fuels, such as steam turbines for nuclear power plants; (3) solar energy; (4) bio-energy technologies, such as making use of renewable plant material animal wastes and industrial waste; (5) thermal energy; (6) automotive energy, such as electric cars; (7) tunnel boring equipment; (8) mining equipment; (9) microturbines, such as those using natural gas, gas from landfills or digester gas; (10) marine drives; and (11) other heavy equipment with a low speed drive, such as rotating cement mixers and earth moving equipment. Likewise, the role of generators may be replaced by prime movers, such as motors, to create a reduction gearbox to drive machines requiring high torque and slow speeds.

While the invention has been particularly shown and described with reference to preferred embodiments thereof, those skilled in the art will understand that the foregoing and other changes in form and detail may be made therein without departing from the scope of the invention.

What is claimed is:

1. A multi-stage gearing apparatus comprising:
A main shaft;
A pair of bull gears on said main shaft;
A number of intermediate gears located around a perimeter of said bull gears;
Each one of said intermediate gears being connected to an input shaft having a double helix pinion that engages said pair of bull gears;
A plurality of output shafts, each one of said output shafts having a single helix output pinion that engages two adjacent intermediate gears; and,
A number of rotational devices, each rotational device being connected to a respective one of said output shafts.

2. The device of claim 1 wherein:
Two different helix angles on said double helix pinion and said pair of bull gears are adjusted to unbalance axial forces.

3. The apparatus of claim 1 wherein:
a single helix output pinion on an output shaft has helical teeth engaging helical teeth on adjacent intermediate gears with tooth loads diametrically opposed such that the tooth forces from said two adjacent intermediate gears that engage said output pinion are radially balanced.

4. The apparatus of claim 3 wherein:
two different helix angles on said double helix pinion and said pair of bull gears are adjusted to unbalance axial forces;
an axial tooth load of said double helix pinion that engages said pair of bull gears is opposite said axial forces; and,
Said output shaft is connected to a rotational device in such a manner that said single helix output pinion is not constrained radially by bearings.

5. The apparatus of claim 1 wherein:
Each one of said input shafts include double helical pinions with helical teeth, which have opposing hands engaging teeth on said bull gears.

6. The apparatus of claim 5 wherein:
said double helix pinions and intermediate gears each have a net thrust reaction of zero.

7. The apparatus of claim 1 in which said number of intermediate gears located around a perimeter of said bull gears is four and said plurality of output shafts is four, such that helical teeth of each output pinion engage helical gears of two intermediate gears that are diametrically opposed.

8. An apparatus comprising:
A main shaft coupled to a source of energy;
A two-stage torque-dividing gearbox coupled to said main shaft;
Said two-stage torque-dividing gearbox having a plurality of output shafts located around said main shaft;
A plurality of rotational devices, each connected to a respective one of said output shafts;
A first stage of said two-stage torque-dividing gearbox being a pair of bull gears on said main shaft and an input shaft having a double helix pinion that engages said pair of bull gears; and,
A second stage of said two-stage torque-dividing gearbox being at least two adjacent intermediate gears, each intermediate gear being located on a respective input shaft; and,
an output shaft, said output shaft having a single-helix output pinion that engages two adjacent intermediate gears.

9. The apparatus of claim 8 wherein:
said single helix output pinion has helical teeth engaging helical teeth on adjacent intermediate gears with tooth loads diametrically opposed such that tooth forces from said two adjacent intermediate gears that engage said output pinion are balanced.

10. The apparatus of claim 8 wherein:
An input shaft includes double helical pinions with helical teeth, which have opposing hands engaging teeth on said two bull gears.

11. The apparatus of claim 10 wherein:
said output shaft is connected to a rotational device in such a manner that said single helix output pinion is not constrained radially by bearings.

12. The apparatus of claim 8 wherein:
Each one of said input shafts includes said double helical pinions with helical teeth which have opposing hands engaging teeth on said two bull gears.

13. The apparatus of claim 12 wherein:
said output shaft is connected to a rotational device in such a manner that said single helix output pinion is not constrained radially by bearings.

14. The apparatus of claim 8 in which said number of intermediate gears located around a perimeter of said bull gears is four and said plurality of output shafts is four, such that helical teeth of each output pinion engage helical gears of two intermediate gears that are diametrically opposed.

15. An apparatus comprising:
A rotor;
A main shaft coupled to said rotor;
A pair of bull gears, each bull gear having gear teeth around a perimeter of said bull gear, said pair of bull gears being coupled to said main shaft;
A number of intermediate gears arranged around said bull gears, each one of said intermediate gears being connected to double helix pinions that engage said gear teeth on said bull gears;
A number of single helix output pinions, each output pinion engaging two adjacent intermediate gears; and,
A number of rotational devices, each one of said rotational devices coupled to one of said output pinions.

16. The apparatus of claim 15 wherein:
each of said number of output pinions is connected to an output shaft; and,
said output shaft is connected to a rotational device in such a manner that said single helix output pinion is not constrained radially by bearings.

17. The apparatus of claim 15 wherein:
each of said number of output pinions is connected to an output shaft; and,
each output shaft includes helical pinions with helical teeth engaging teeth on said two adjacent intermediate gears.

18. The apparatus of claim 17 wherein:
each output shaft is connected to an electric rotational device such that said output pinions are not radially constrained.

19. The apparatus of claim 15 wherein:
each of said number of output pinions is connected to an output shaft; and,
Each one of said output shafts includes a helical pinion with helical teeth engaging teeth on two adjacent intermediate gears.

20. The apparatus of claim 19 wherein:
each output shaft is connected to a rotational device in such a manner that said single helix output pinion is not constrained radially by bearings.

21. The apparatus of claim 15 in which said number of intermediate gears located around a perimeter of said bull gears is four and said plurality of output shafts is four, such that helical teeth of each output pinion engage helical gears of two intermediate gears that are diametrically opposed.

* * * * *